US006603218B1

(12) United States Patent
Aisa

(10) Patent No.: US 6,603,218 B1
(45) Date of Patent: Aug. 5, 2003

(54) METHOD, SYSTEM AND DEVICE FOR MANAGING THE CONSUMPTION OF ELECTRIC ENERGY IN A DOMESTIC ENVIRONMENT

(75) Inventor: Valerio Aisa, Fabriano (IT)

(73) Assignee: Wrap S.p.A., Fabriano (IT)

( * ) Notice: Subject to any disclaimer, the term of this patent is extended or adjusted under 35 U.S.C. 154(b) by 0 days.

(21) Appl. No.: 09/890,901

(22) PCT Filed: Feb. 2, 2000

(86) PCT No.: PCT/IB00/00092

§ 371 (c)(1),
(2), (4) Date: Aug. 7, 2001

(87) PCT Pub. No.: WO00/52806

PCT Pub. Date: Sep. 8, 2000

(51) Int. Cl.[7] .................... H02J 3/14
(52) U.S. Cl. .................... 307/31; 307/32; 307/33; 307/38
(58) Field of Search .................... 307/31, 32, 33, 307/38

(56) References Cited

U.S. PATENT DOCUMENTS 6,487,509 B1 * 11/2002 Aisa .................... 702/62

FOREIGN PATENT DOCUMENTS

DE 19502786 A 8/1996
EP 0727668 A 8/1996
FR 2677469 A 12/1992

* cited by examiner

*Primary Examiner*—Brian Sircus
*Assistant Examiner*—Robert DeBeradinis
(74) *Attorney, Agent, or Firm*—Cesari and McKenna, LLP

(57) ABSTRACT

A method is described, for managing the energy consumption of electric users (LB, LS, FO, PG, CO), including household appliances, in a domestic environment (A), said users being operatively connected in a network (RE), each one of said users (LB, LS, FO, FG, CO) presenting an electric load to a source of electric energy, comprising the steps of: presetting an appropriate maximum limit of power (Pmax) which can be supplied by said source of electric energy, providing each user (LB, LS, FO, FG, CO) with control means for managing its own consumption of electric energy, measuring the instantaneous total consumption of the electric energy (Ply) supplied by said source to said domestic environment (A), transmitting to the control means of each one of said users (LB, LS, FO, FG, CO), by means of said network (RE), information relating to the instantaneous total consumption of the supplied electric energy (PIT), making the control means of each one of said users (LB, LS, FO, FG, CO) capable of adjusting the electric load being presented to said source of energy by the respective user in response to said information. According to the invention, said information relating the instantaneous total consumption of the electric energy (PT) is transmitted on said network (RE) with a frequency which is variable in function of: the value of the instantaneous total consumption of the absorbed electric energy (PT), measured by a measuring device (MP), and said maximum limit of available power (Pmax).

27 Claims, 2 Drawing Sheets

METHOD, SYSTEM AND DEVICE FOR MANAGING THE CONSUMPTION OF ELECTRIC ENERGY IN A DOMESTIC ENVIRONMENT

DESCRIPTION

The present invention relates to a method, a system and a device for managing the consumption of electric energy in a domestic environment.

As known, the problem of limiting the total electric power being absorbed in a domestic environment becomes more and more important; this is substantially due to the following two reasons:

first, because it solves the problem of accidental interruptions of electric energy (blackouts), due to the operation of a limiting device (generally a thermal device, sensitive to the current quantity flowing through it), which is associated to the maximum value of the available electric power (contractual power value), as defined in the power supply contract signed between the electricity supplier and the user;

secondly, more in general, because it allows for keeping the electric power absorption below a determined level, so avoiding the so-called absorption "peaks" and favoring significant economies upstream, by virtue of a better planning of the electric energy production.

The first reason concerns above all those countries which, due to their not being self-sufficient from an electric energy production standpoint, tend to impose limitations on the domestic consumptions, to the benefit of the industrial and manufacturing consumptions; this is for instance the situation in Italy, where the typical domestic electric energy supply contract covers 3 kW only.

On the other hand, the above cited second reason has a more general application, since it also concerns those countries which, even if plenty of electric energy (e.g. by virtue of nuclear power plants), have anyway to gradually limit the consumption, in observance of international directions for the environmental protection, which impose limit values to harmful emissions.

To this purpose, incentive procedures being founded on instruments for the reduction of the cost of the electric energy, are presently studied, for instance in Europe, which provides for the application of differential tariffs according to the following two criterions:

a first criterion, of the "horizontal" type, being already adopted in many countries, which consists in applying differentiated tariffs for time intervals, in particular lower tariffs during the night hours;

a second criterion, of the "vertical" type, presently still under study, which consist in applying, for the same time interval, tariffs being differentiated in function of the level of electric power absorption, according to the procedures adopted for instance by the Internal Revenue Office for income taxation.

For the above purposes, a number of solutions have been proposed, concerning the rationalization of the energy consumption in the domestic environment.

In most known solutions, the management of the electric energy consumption in a household environment is realized by means of a central supervision unit; this unit manages the various electric loads, through a direct control of the electric household apparatuses equipped with suitable control systems, or using "smart" sockets, which control the supply of electric energy to the apparatuses themselves, through ON-OFF operations.

The central supervision units of the above type are featured by the fact that they carry out an activity of the automatic type, even if following an appropriate initial configuration by the individual using the appliance (hereinafter referred to as "consumer"); the central supervision units are also characterized in that they are arranged at a hierarchical level being higher with respect to the electric household users, i.e. performing a master role, with active control on the latter.

However, such known "centralized" supervision or managing systems have some drawbacks.

A first type of drawback is due to the complex of the supervision unit, which should be a programmable one, since it has to manage a plurality of household appliances at different times and with different procedures; now, this necessarily presumes a relevant programming engagement for the consumer.

A second type of drawback is the poor efficiency of the supervision unit, normally limiting itself to manage the electric supply of the various household apparatuses, based on a mere ON/OFF activity alone, and which under an excessive power absorption condition, provides for the deactivation of the power user having a minor importance priority. In order to clarify the concept of "poor efficiency" expressed in this second point, let us consider for instance the event where the deactivated power user is a washing machine performing its water heating step. In this event, in fact, the total cutoff of the machine will hinder the exploitation of the thermal energy already accumulated by the water, whereas it would be possible to exploit it should the washing machine continue the drum rotation, with just about. 0,1 kW power, even by interrupting the water heating, which is typically associated to a power absorption of 2 kW.

A third type of drawback is related to the cost of the supervision unit, which requires, for allowing its programming, an appropriate consumer-interface, usually consisting of a keyboard and a display, and an electronic control system with adequate processing power and memory (such as a Personal Computer).

A fully alternative solution to this "centralized" control and supervision approach for the household users is disclosed in the European Patent Application EP-A-0 727 668, in the name of the applicant of the present invention, which is based on a system architecture of the distributed type.

Such a document describes a set of household appliances capable of constantly receiving information concerning the total absorption of power of all the household users (household appliances, lighting installation, room conditioning system, etc.), the maximum available power (power supply contract), the current time (clock function) and the likely different cost of the energy depending on the time ranges.

Such information are supplied by means of a proper meter, located outside the household appliances, which may be the same electricity meter, suitable prearranged, or a specific ad hoc optional device; the means used for transmitting the information may be of any type, but the preferred one is the power line, i.e. the same electric network. Based on the information received from the external meter, and depending upon determined priority levels associated to the various household appliances, the same household appliances (which are individually fitted with an appropriate electronic control system and suitable interface means to the electric network) are able to "spontaneously" and automatically limit their own electric power consumption, so as to maintain the total consumption of the whole household environment constantly below the limit imposed by the value of the contractual power, the above requiring neither any external centralized supervision system, nor any intervention by the consumer.

Thus, the system described in EP-A-0 727 668 allows for achieving important advantages, in terms of simplicity of use and flexibility, with respect to the previous known solutions based on the application of a central supervision unit.

The system described in EP-A-0 727 668 provides for the control system of each individual household apparatus ta receive the information concerning the instantaneous total consumption of the electric energy, which is transmitted by the external meter at regular time intervals on the communication bus, the latter consisting, as said, of the same electric network.

However, such an approach of transmitting the information which relates to the instantaneous total consumption of the electric energy at regular time intervals may cause some drawbacks.

In particular, EP-A-0 727 668 suggests adopting a relatively long fixed interval between two subsequent transmissions of the above said information, i.e. in the order of several tens of seconds; as a result, the household appliances may not be able to react promptly enough, in order to avoid exceeding the maximum power absorption allowed.

Let us assume, for instance, that a household appliance is activated, which therefore draws electric energy from the mains, in the following situation:

a) immediately after the external meter has sent on the communication network the information relating to the instantaneous total consumption; and b) when the level of absorbed power being determined by the operation of other apparatuses is already close to the maximum limit value.

It is obvious, in this situation, that the further current consumption caused by the new household apparatus just activated will determine the exceeding of the contractual or usable power value, with a consequent possible blackout; this because in the time interval required for sending the new consumption information by the external meter, the other household apparatuses of the network cannot react and automatically limit their own consumption of electric power for m the total consumption of the whole domestic environment below the limit imported by the value of the contractual power.

Theoretically, the above drawback could be reduced by increasing the transmission frequency of the above information, for example with transmission intervals in the order of a second; however, it is clear that such a solution would considerably increase the communications flow on the bus, due to nearly constant presence of the information relating to the instantaneous total consumption on the network.

It is the object of the present invention to solve the above drawback and indicate a solution for the improved managing of the consumption of electric energy in a domestic environment, in order to avoid the exceeding of the limit of maximum power which can be supplied, as provided by the electric energy supply contract, or another convenient limit appropriately established by the consumer.

Within this general frame, the present invention has the aim of indicating a managing method, of the type as described in EP-A-0 727 668, where, however, the communication network among the various household apparatuses can be smartly engaged, so avoiding useless overloading, save if strictly required, and warranting as a consequence, a greater solidity of the same communication system.

Further aims of the present invention are to provide a managing procedure and a metering device for the realization of the above system, in a simple and efficient way.

These and other aims, which will be better highlighted in the following, are obtained according to the present invention through a method, a system and a device for managing the consumption of electric energy in a domestic environment incorporating the features of the annexed claims, which form an integral part of the present description.

The aims, the features and the advantages of the present invention will become apparent from the following detailed description and the annexed drawings, which are supplied by way of non limiting example, wherein.

Figure 1:
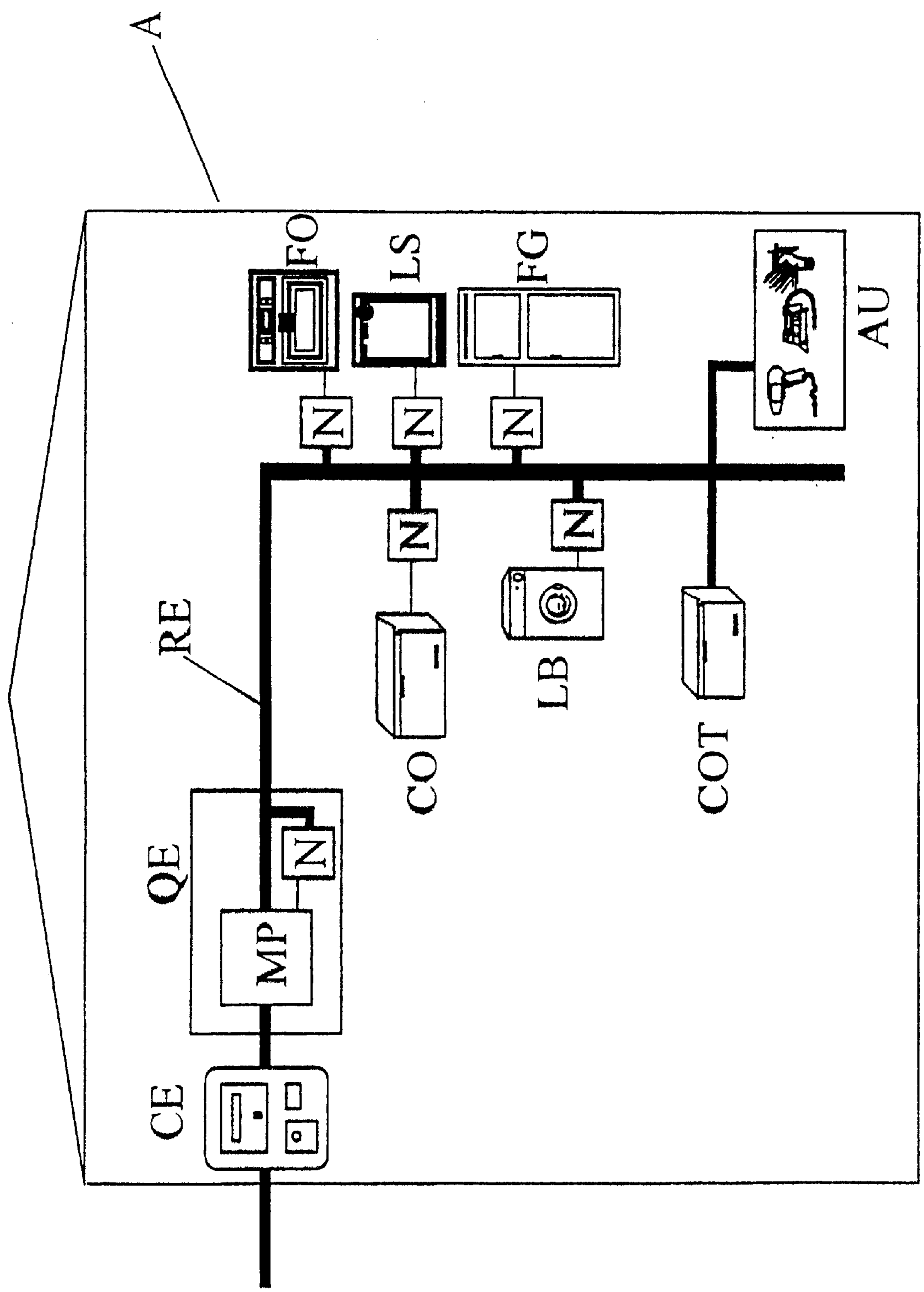
FIG. 1 shows schematically a domestic environment, where various power users are present, among which those pertaining to a system for the optimized managing of the electric energy consumption, which ark interconnected through a suitable communication network, according to the present invention.

In FIG. 1 a system of electric apparatuses pertaining to one same domestic environment A is represented as a whole, according to the teachings of the present invention.

Such a system is based on the connection in network of a plurality of household appliances, or more generally, various domestic electric users, and has the aim of rationalizing the absorption of electric power by the various household users, in order to avoid the exceeding of a determined preset limit, which is represented by the contractual power value, or other convenient limit value established by the consumer.

The general structure of the system represented in FIG. 1 and of the various household users is of the type as described in EP-A-0 727 668, whose relevant teachings are herein incorporated by reference. In this frame, the various household apparatuses are appropriately prearranged for dynamically self-adjusting their own energy consumption, by adapting it continuously to the variable global power necessities, which can vary during the day, of the household environment A where the are operating. In other words, such household apparatuses according to the present invention are equipped with control systems having at least the following fundamental features:

1) capability of receiving through an appropriate transmissive means and an appropriate electronic interface, information relating to the total instantaneous consumption of the electric energy (or, more simply, of the total electric current consumption) and the prefixed maximum limit relating to the domestic environment where they are operating, said information being supplied by a special meter suitable for that purpose;

2) capability of interpreting the information relating to the total absorption of power in function of the limit of maximum power which can be supplied, being defined by the supply contract (contractual power), or in function of a convenient limit prefixed by the consumer (such as tied to a lower power tariff);

3) capability of constantly managing their own consumption of electric energy coherently with the specific function of the household appliance itself and, to a maximum possible extent, with the function performed by the other household electric apparatuses.

Point 1) above highlights the need of a suitable instrument for measuring the electric power absorbed by the domestic environment and of an adequate communication system between the above measuring device and the electric users fitted, according to the present invention, with a system for the dynamic self-adjustment of the energy consumption.

Points 2) and 3) above highlight the need of fitting the household appliance with a control system which is capable, based on the information transmitted by the power measuring device, to contribute to maintain the total power absorption of the whole domestic environment below a maximum limit (established by the supply contract or set by the user for personal convenience) searching from time to time the best possible compromise between the need of reducing the absorbed power and the need of warranting an acceptable performance.

To this purpose, in FIG. 1, reference RE indicates a communication network of the domestic environment, to which the various household apparatuses are connected to; in the given example, the network RE consists the same domestic electric network and the communication system between the various household apparatuses is of the power line carrier type, allowing information exchange between the various nodes, indicated with N, to be further described, without the need of introducing an extra wiring system in the house.

Each node N comprises for instance a suitable microcontroller, which manages the communication protocol (i.e. the set of rules through which it exchange information with the other nodes of the network), and a suitable electronic interface comprising a bi-directional modem for power line carrier of the half-duplex type, i.e. capable of exchanging information in both directions but at different times, and a suitable adapter for the communication network, which as said is represented in the example by the electric network RE.

CE indicates an usual electric energy meter of the domestic environment; it is assumed that such a meter CE is located at the entry of the domestic electric network, even if in reality it is often found on the ground floor (in the instance of a condominium), or outside the building itself (in the instance of family houses).

QE indicates the main distribution board, located directly downstream of the meter CE, which contains, besides all conventional actuating devices (switches) and safety devices (power limiters, "lifesavers", etc . . . ), also an appropriate measuring device MP connected to the network through a relevant node N.

FO, LS, FG, LB and CO indicate an oven, a dishwasher, a refrigerator, a washing machine and a freezer, respectively, each one being fitted with a proper electronic control system, having the function capabilities previously mentioned and adequately connected to the network through a relevant node N.

COT indicates a conventional freezer, i.e. without an electronic control system as described above and consequently unable to communicate directly with the external world.

Similarly, AU indicates all other electric users present in the house (such as an iron, a hair-dryer, a mixer, a bread-toaster, an electric stove, various lamps, and so on), which are not capable of self-adjusting their own energy consumption on the basis of the information supplied by the power measuring device MP located at the entry of the electric network.

Such conventional users COT and AU are no active elements of the self-adjusting system of the power absorption, but they are inserted, anyway, in the logic of this system, since they represent independent electric loads which are, with respect to other "smart" users, devices being of maximum or absolute priority, which should be geared in order to avoid exceeding globally the prefixed maximum limit of power which can be absorbed by the whole domestic environment.

The measuring device MP is referred to the initial non-sectioned length of the electric network RE, and is provided for measuring the total power absorbed by the whole domestic environment; the measuring device MP is capable of sending directly on the electric network RE, through the relevant interface node N, the information containing the value of the total power absorbed by the household environment and the value of the allowed maximum limit (contractual power value or other convenient value set by the consumer).

According to the present invention, the frequency of transmission of such information depends, as it will be further explained, right on the measured value of electric power, or more simply of the current value alone, related to the prefixed maximum limit. It should be appreciated, in fact, how in a possible simplified embodiment of the present invention, the measuring device MP may be provided for sending on the electric network RE the value of the total current absorbed by the domestic environment, instead of the value of the absorbed total power. Such an exemplification is justified in that the device limiting the maximum value of power which can be supplied according to the supply contract is typically a thermal limiter, whose operation for interrupting the electric network is caused by the heating caused by the current flow, independently from the value of the supply voltage (and therefore of the power).

The measuring device MP can be manufactured according to known techniques; merely by way of example, for instance, if it is provided for measuring the total absorbed power, such a measuring device MP may comprise:

- an ammeter, for the measurement of the current;
- a voltmeter, for the measurement of the voltage;
- a control logic, for managing the measuring device MP globally;
- a stabilized feeder, for direct-current supply, at low-voltage, of the various active components of the system;
- a likely filter for the suppression, towards the external world, of the information associated to the power line carrier communication system.

In this frame, the control logic of the measuring device MP, being based on the use of a microprocessor, performs at least three fundamental functions:

- the function of measuring the active power or the current) absorbed by the household users;
- the function of sending such information, along with the information relating
- to the maximum limit of power which can be absorbed, on the same electric network RE, through the power line carrier transmission system;
- the function of establishing the frequency through which the measuring device MP
- sends the above pieces of information on the electric network RE.

Referring to the implementation example previously described, the measurement of the active power being absorbed may be performed for example by the control logic of the measuring device MP on the basis of the signals sent by the voltmeter and the ammeter, due consideration being given to the value of the phase displacement angle between voltage and current. The power is calculated by the measuring device MP on the basis of the values of the active voltage (through the voltmeter) and the active current (through the ammeter), and on the value of the phase displacement angle, which is obtained by measuring the time elapsing from the zero voltage instant to the zero current instant.

The transmission on the household "bus" RE of the measured value of the active power, being absorbed by the household users, is per formed by the control logic through the interface N of the measuring device MP. Obviously, the interface N of the measuring device MP should be able to manage the dialog on the power line carrier "bus", and ensure the observance of the international standards on electric safety, electromagnetic compatibility and the information exchange procedures.

Therefore, as it can be seen, the measuring device MP is an apparatus apt for measuring the total power (or more simply, the current) absorbed by the domestic environment and communicate the measured value spontaneously to the "smart" users FO, LS, FG, LB, CO connected to the electric network RE, in accordance with the previously indicated logic; therefore; it should be associated to the presence of electric users being capable of self-adjusting their own consumption on the basis of the actual available power and in relation with the priorities featuring them, as further detailed.

In general, the system represented in FIG. 1 operates as follows.

The electric energy for the domestic environment is drawn from the external power mains through the energy meter CE. As mentioned above, the power absorbed by the domestic environment is limited by means of a proper limiting device (not shown), which limits the installed power according to the supply contract; in the given example, let assume that a maximum limit Pmax of power which can be supplied of 3 kWh has been established (contractual power).

The household appliances FO, LS, FG, LB, CO, COT, AU are electrically supplied through standard current sockets. The control system of each "smart" household appliance FO, LS, FG, LB, CO receives from the measuring device MP, with a frequency according to a logic which will be further described, the instant value of the total power PT, being absorbed right at the moment by the various active electric users of the domestic environment, and the prefixed value Pmax of the maximum power which can be absorbed.

The control system of each active household appliance verifies if the instant value of the total power PT absorbed by the various household users is higher than the maximum power Pmax, set forth by the supply contract and controlled by the above power limiter.

For instance, with reference to the dishwasher LS, should the instant value of the total power PT absorbed by the domestic environment A be higher than Pmax, when starting a specific operation cycle of the dishwasher LS itself, then the control system would provide for reducing the energy consumption of the relevant appliance LS by a quantity higher or equal to the difference PT-Pmax; subsequently, the control system of the dishwasher LS will update itself on the value of the present total power PT absorbed by the various active users of the domestic environment (as said, such piece of information is sent on the network by the measuring device MP).

Vice-versa, should PT be lower or equal to Pmax, then the control system would verify the power absorption status of the relevant appliance LS, in view of a likely modification of the operation mode of the dishwasher itself.

If, following this control, the appliance LS results in operating under normal conditions, i.e. it has not been subjected to any reduction of the power required in that moment for its normal operation, the control system of the dishwasher LS will only update internally the value of the total power absorbed by the domestic environment, without changing its operation mode.

If instead the control system of the dishwasher LS had already to perform a previous reduction of the energy consumption of the relevant household appliance, it may now allow for an increase of the energy consumption, but taking into account that the maximum quantity of additional power cannot exceed the difference Pmax-PT.

As it can be seen, therefore, the control system of each household appliance FO, LS, OF. LB, CO has the capability of reducing or normalize the energy consumption requested by a particular phase of the operating cycle in course of execution by the appliance itself.

The system for self-adjusting the power absorbed by each "smart" user may of course be much more sophisticated than described above by mere way of example, but an investigation of this aspect does not concern the purposes of the present invention.

Obviously, the system described above provides priority rules between the various electric users, in order to warrant a dynamic distribution of energy in function of the different type of household apparatuses which are active from time to time, and in function of the significance of the role said apparatuses have with respect to the consumer.

In the event, in fact, that both the oven OF and the dishwasher LS are simultaneously active, the latter may automatically decide to give priority to the oven, since food baking should be considered a priority against washing-up; as a result, the dishwasher will for example perform the water heating only during the natural rest intervals of the oven heating.

In other words, in the above way, it is possible to let several household appliances active, being susceptible of taking all together an electric power which is higher than the installed power for the individual domestic environment A, but without causing any black-outs or the exceeding, anyway, of a prefixed maximum limit of power which can be absorbed.

As said, this presumes for each "smart" user to be capable of communicating with the other electric users of equal grade, negotiating its own power absorption with them in such a way to avoid exceeding globally the allowed maximum value, in the respect of the different priorities of each user. Conventionally, the traditional electric users COT and AU are assigned a maximum priority.

Figure 2:
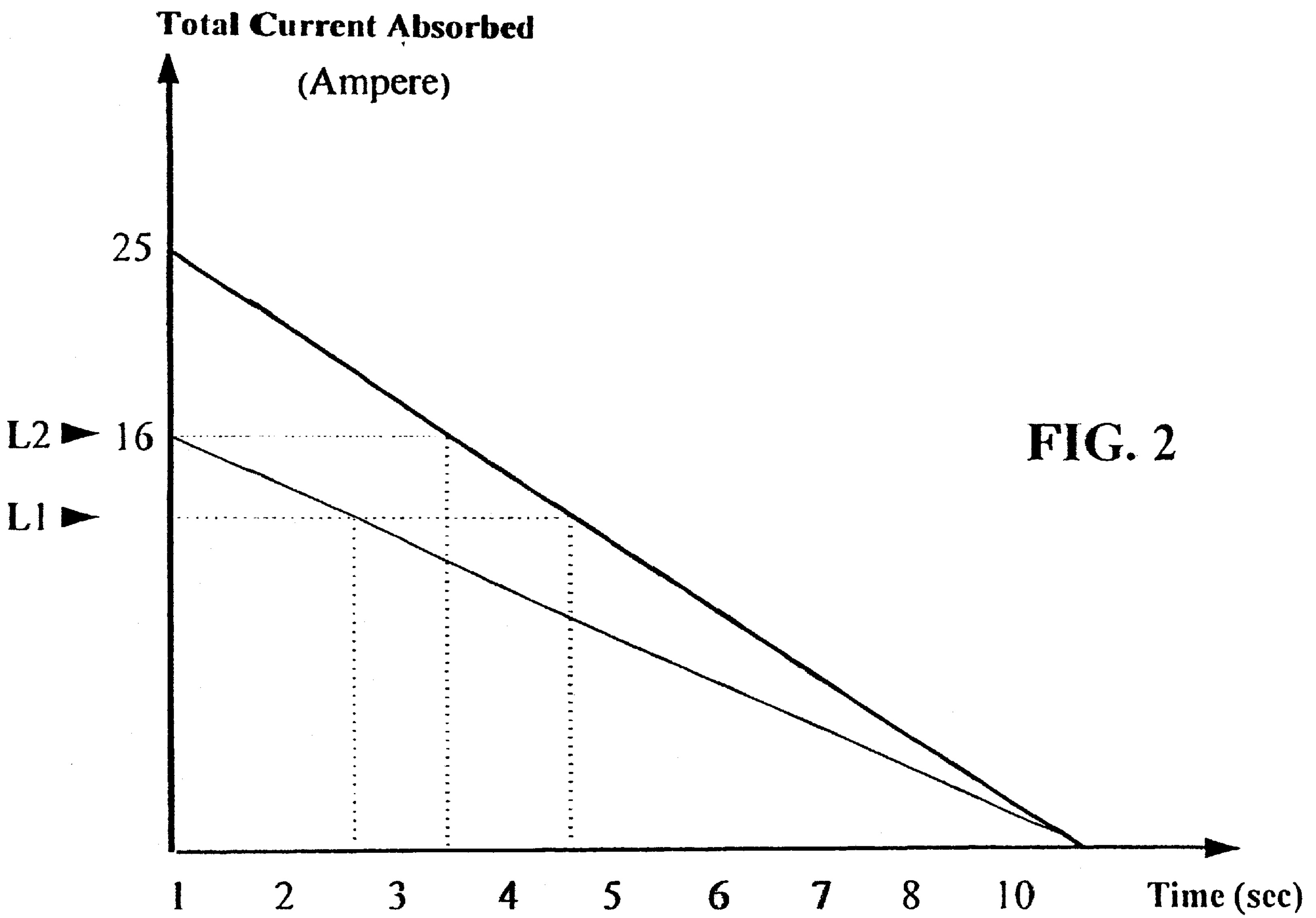
FIG. 2 shows graphically the relation exist between the value of the total current absorbed by the domestic environment, referred to the maximum preset limit, and the frequency with which a metering device, being part of the system according to the present invention, transmits on the communication network the measured value of total current.

FIG. 2 represents by way of example the simplest case where the measuring device MP performs current measurements instead of active power measurements. A graphic illustration shows the relationship between the values of the total current absorbed by the domestic environment and its maximum allowed limit, and the frequency with which the measuring device MP transmits on the communication network RE the measured value of total current.

The diagram of FIG. 2 highlights how, according to the specific aims of the present invention, the time interval elapsing from a communication to the other one depends on the value of the measured power and the allowed maximum value (supply contract or other convenient limit set by the consumer).

In particular, two different situations are indicated in FIG. 2, where the maximum limit being fixed for the current which can be absorbed is equal to 16 and 25 Ampere, respectively; here, the value of instant power absorbed by the domestic environment A in a first operating condition is defined with L1, whereas the value of instant power absorbed in a second operating condition is defined with L2.

In the case that the maximum allowed current absorption Pmax is 16 Ampere, both values L1 and L2 are communicated by the measuring device MP on the network RE with a different timing.

The measurement L1, in fact, is communicated around every 2.6 seconds, in the event the value of the maximum current which can be absorbed Pmax equals 16 Ampere, and around every 4,6 seconds in the event the value of the maximum current which can be absorbed Pmax equals 25 Ampere.

In the example, should the maximum current which can be absorbed Pmax equal 16 Ampere, then the measurement L2 would just corresponds to the maximum value allowed for Pmax, and be communicated every second (which here can be presumed as the maximum speed permitted for the power line carrier system); vice-versa, should the value of the maximum current which can be absorbed Pmax equal 25 Ampere, the measurement L2 would then be communicated around every 3.5 seconds.

As it can be seen, according to the present invention the measuring device MP does not send on the network RE the information relating to the total current absorbed by the domestic environment at a fixed frequency; on the contrary, it sends said information a frequency that varies depending on the value 6f such a current and the maximum limit allowed.

In other words, the following principle is adopted by the measuring device MP in choosing the frequency for sending the piece of information relating to the measured value of total power; the closer the measurement to the maximum value allowed, the faster the communication of such a value to the electric users, so that they can promptly react for avoiding the exceeding of the maximum absorption allowed.

It is the purpose of the above procedure to engage tie communication network RE in a smart way, for avoiding useless overloading when not strictly required, and ensuring consequently a sturdier communication system. As a matter of fact, a reduction of the number of pieces of information transmitted in time leads to a sturdier communication system, since its efficiency is less subject to network interference and/or likely communications carried out by other systems adopting the same transmission means and the same frequencies band (such as safety systems, alarm systems, etc. . . .).

It should be noticed that the values of the frequency of communication reported in the graph of FIG. 2 are merely indicative, for the sole purpose of illustrating the principle adopted for managing the communication of the current value measured.

Obviously, an exact definition of such values depends on the intended objects (minimization of the communication network engagement) and on the communication technology adopted (power line carrier with Echelon system or other analogous system available on the market).

Specifications related to the measurement performed by the measuring device MP may be as follows:

- maximum power limit to be taken into account: 12 kW;
- consumer's capability of setting the maximum power limit (contract value, or limit imposed by convenience reasons), through a proper selector (such as a 3-positions dip-switch), considering 1.5 kW power increments (i.e. 1.5–3.0–4.5 6.0–7.5–9.0–12.0 kW);
- measurement precision: +/−10% FS (however, a fault in excess is retained preferable to a fault in defect).

The features of the present invention appear to be clear from the above description.

In particular, a method has been described, for managing the energy consumption of electric users in a domestic environment, among which household appliances, said users being operatively connected in a network, each one of said users presenting an electric load to a source of electric energy; the method comprises the steps of;

- prefixing an appropriate maximum limit of power which can be supplied by said source of electric energy,
- providing each user with control means for managing its own consumption of electric energy,
- measuring the instantaneous total consumption of the electric energy supplied by said source to said domestic environment,
- transmitting to the control means of each one of said users, by means of said network, information relating to the instantaneous total consumption of the said supplied electric energy,
- making the control means of each one of said users capable of adjusting the electric load being presented to said source of energy by the relevant user in response to said information.

According to the invention, the information relating to the instantaneous total consumption of the electric energy is transmitted on said network with a frequency which is variable in function of

- the value of the instantaneous total consumption of the absorbed electric energy, measured by a measuring device, and
- the prefixed maximum limit of power which can be supplied.

Preferably, the more the value of instantaneous total consumption of the electric energy measured by the measuring device approaches the prefixed power limit, the higher is the frequency of transmission on said network of the information relating to the instantaneous total consumption; said information relates to the value of total power absorbed or, in a simplified form, to the value of the total current absorbed in the domestic environment.

Moreover, a system for managing the energy consumption in a domestic environment has been described, which provides for:

- a plurality of electric users, among which household apparatuses, connected to a communication network:
- a measuring device, located outside said electric users and connected to said network, which is apt for measuring the instantaneous total consumption of electric energy in the domestic environment.

Each one of said electric users comprises control means, which are apt for managing its own consumption of electric energy, in order to avoid the interruptions (black-outs) in the supply of the electric energy to the domestic environment which could derives from the exceeding of a prefixed limit of maximum available power, where the latter may be a determined limit of convenience set by a consumer (associated for instance to a lower cost of the electric energy); such a managing is realized by the control means in function of information relating to the instantaneous total consumption of the electric energy in the domestic environment and the prefixed maximum limit; said pieces of information being in particular made available on the above network through said measuring device.

According to the invention, the system provides for means for varying the frequency of transmission on said network of said information relating to the instantaneous total consumption of the electric energy and/or to the prefixed maximum limit, in function of the value of the instantaneous total consumption of electric energy measured by the measuring device.

The advantages of the present invention are also clear from the above description. In particular, through the present invention it is possible to engage the communication network among the various household apparatuses in a smart way, in order to avoid useless overloads, unless strictly required, and ensure as a result a sturdier communication system, It is obvious that many changes are possible for the man skilled in the art to the subject of the present invention as previously described by way of example.

For instance, the use of the above cited system for information exchange, based on power line carrier, has been indicated in virtue of its practical convenience, since it does not require installation of any communication line and is therefore compatible with the electric network of any domestic environment; however, it is obvious that other means may be used for exchanging information as required for the present invention, such as a simple two-wire cable, like a telephone duplex cable (highly cost-effective solution), a coaxial cable, a radio-waves system, an infrared rays system, etc.

In the event where the measuring device MP sends on the network RE only the total current absorbed, this will reduce the complexity (and the cost as well) and simplify the management of the absorption at the level of each "smart" user.

The above example describes how the measuring device MP provides for automatically and spontaneously sending the measured value to all the electric users connected in the network; however, it is clear that the system according to the present invention may provide the possibility for the measuring device MP to send its measured value also upon specific request of any node N or control system of the household appliances connected to the network.

According to other possible embodiments, the measuring device MP may also perform functions other than the ones previously described.

For instance, the measuring device MP may perform a clock and calendar function, protected against possible mains black-outs; in this instance, also the current time of day value would be spontaneously sent (and eventually on request from outside) by the measuring device MP, the same as it happens for either the power or current measurement.

To this purpose, a possible principle could be adopted, which would provide for:

- transmitting the current time of day and date (day, month and year) at the power on which follows each black-out;
- transmitting the current time of day every 5 minutes;
- transmitting also the date once a day (e.g. at midnight);
- transmission capability, at any time, of the current time of day and/or the date on specific request from any network node.

According to a further variant embodiment, the measuring device MP may be fitted with a display device, such as an LCD display, and relevant buttons for setting both the date and time of day; or it may be fitted with a radio-assisted clock (such as associated to the Frankfurt's precision clock frequencies or other analogous radio sources, including GPS systems, available in Europe and worldwide), so avoiding any consumer's operations.

Finally, the measuring device MP may be advantageously fitted with a service serial interface, such as of the RS 232 type, for testing the apparatus, updating its software, and so on.

What is claimed is:

1. A method for managing energy consumption of a network of household appliances, the method including the steps of A. measuring at the household the instantaneous total energy consumption of the household;

B. transmitting over the network to the household appliances information relating to the total energy consumption and varying the time between transmission of the information based on a difference between the measured total energy consumption value and a predetermined maximum energy consumption value; and C. controlling the operations of the household appliances in response to the energy consumption information, to maintain total energy consumption for the household at or below the predetermined maximum.

2. The method of claim 1 wherein the step of transmitting transmits the information with shorter time between transmissions as the measured energy value approaches the predetermined maximum value.

3. The method of claim 2 wherein the transmitted information relates to the total power in use by the household.

4. The method of claim 2 wherein the transmitted information relates to the total current utilized by the household.

5. The method of claim 1 wherein the step of controlling the operations of the household appliances includes the appliances individually and automatically controlling their operations to maintain total energy consumption below the predetermined maximum value.

6. The method of claim 5 wherein the step of controlling the operations of the household appliances further includes dynamically adjusting the energy consumption of one or more of the appliances.

7. The method of claim 6 wherein the step of controlling further includes adapting operating cycles of one or more of the appliances to maintain the instantaneous total energy consumption below the predetermined maximum energy consumption value.

8. The method of claim 1 wherein the step of transmitting further includes transmitting the predetermined maximum energy consumption value.

9. The method of claim 8 wherein the step of transmitting also includes transmitting the predetermined maximum energy consumption value that corresponds to the time of transmission.

10. The method of claim 1 wherein i. the step of transmitting further includes appliances transmitting indications of being operative, and ii. the step of controlling further includes controlling the individual appliances at a given time based on assigned relative priorities of the appliances operating at the given time.

11. The method of claim 10 wherein the step of transmitting also includes the operative appliance transmitting priority information.

12. The method of claim 1 further including the step of transmitting the current time of day or current date on the network.

13. A system for managing energy consumption of a network of household appliances, the system including:

A. a plurality of household appliances; and

B. a meter for measuring the instantaneous total energy consumption of the household, the meter transmitting over the network to the household appliances information relating to the total energy consumption and varying the time between transmission of the information based on a difference between the measured total energy consumption value and a predetermined maximum energy consumption value;

C. the household appliances controlling their operations in response to the energy consumption information, to maintain total energy consumption for the household at or below the predetermined maximum.

14. The system of claim 13 wherein the meter transmits the information with shorter time between transmissions as the measured energy value approaches the predetermined maximum value.

15. The system of claim 13 wherein the meter transmits information that relates to the total power in use by the household.

16. The system of claim 13 wherein the meter transmits information that relates to the total current utilized by the household.

17. The system of claim 13 wherein the household appliances individually and automatically control their operations to maintain total energy consumption below the predetermined maximum value.

18. The system of claim 17 wherein one or more of the plurality of household appliances further dynamically adjusts their energy consumption in order to maintain instantaneous total energy consumption below the predetermined maximum value.

19. The system of claim 18 wherein one or more of the plurality of household appliances adapts their operating cycles in order to maintain the instantaneous total energy consumption below the predetermined maximum energy consumption value.

20. The system of claim 13 wherein the meter further transmits the predetermined maximum energy consumption value.

21. The system of claim 20 wherein the meter in a given transmission transmits the predetermined maximum energy consumption value that corresponds to the time of the transmission.

22. The system of claim 13 wherein the household appliances further i. transmit indications of being operative, and ii. individual appliances control their operations at a given time based on assigned relative priorities of the appliances operating at the given time.

23. The system method of claim 22 wherein the household appliances operative at a given time also transmit priority information.

24. The system of claim 13 wherein the meter further transmits the current time of day or current date on the network.

25. A power meter for transmitting total energy consumption information over a network of household appliances, the power meter including:

A. means for reading energy consumption; and

B. a transmitter for transmitting information relating the energy consumption over the network, the transmitter transmitting the information at variable rates based on a difference between the energy consumption determined by the meter and an applicable predetermined maximum energy limit.

26. The power meter of claim 25 further including:

C. storage locations for storing maximum energy limits that are associated with time of day; and D. the transmitter determines the applicable maximum energy limit based on the current time and date.

27. The power meter of claim 26 wherein the power meter further transmits the current time and date.

* * * * *